United States Patent [19]
Bonnet et al.

[11] Patent Number: 4,739,487
[45] Date of Patent: Apr. 19, 1988

[54] METHOD AND APPARATUS FOR A RECIPROCATING LAY SYSTEM OF PROFILE PIECES ON A BASE FOR THE PURPOSE OF PLOTTING AND/OR CUTTING

[75] Inventors: Pierre Bonnet; Rémy Villaret, both of Miramont-de-Guyenne, France

[73] Assignee: Etablissements G. Imbert, France

[21] Appl. No.: 737,245

[22] Filed: May 22, 1985

[30] Foreign Application Priority Data

May 22, 1984 [FR] France .................. 84 08098

[51] Int. Cl.⁴ .................. B26D 5/34; B26D 7/20; D06H 7/00; A41H 3/00
[52] U.S. Cl. .................. 364/475; 364/470; 353/28
[58] Field of Search .................. 364/474, 475, 470; 353/11, 28, 62, 63, 64

[56] References Cited

U.S. PATENT DOCUMENTS

| | | | |
|---|---|---|---|
| 3,596,068 | 7/1971 | Doyle | 364/475 |
| 3,761,675 | 9/1973 | Mason | 364/475 |
| 3,769,488 | 10/1973 | Hasslinger | 364/475 |
| 3,887,903 | 6/1975 | Martell | 364/200 |
| 3,900,253 | 8/1975 | Astero | 353/63 |
| 4,124,285 | 11/1978 | Johnson | 353/28 |
| 4,551,810 | 11/1985 | Levine | 364/475 |
| 4,554,635 | 11/1985 | Levine | 364/475 |
| 4,569,024 | 2/1986 | Reichart | 364/475 |
| 4,583,181 | 4/1986 | Gerber | 364/475 |
| 4,601,224 | 7/1986 | Clark | 83/71 |

*Primary Examiner*—Jerry Smith
*Assistant Examiner*—Allen MacDonald
*Attorney, Agent, or Firm*—Robert J. Koch

[57] ABSTRACT

The invention relates to a reciprocating process and apparatus for laying profile pieces on a base in view of plotting and/or cutting off.

The process is characterized by the fact that it comprises the storage into a computer unit (1) of the coordinates of templates, shapes, patterns for cutting out, after the positioning of the base on a plotting or cutting table, the direct or indirect projection on the surface of said base of one or more images of said stored templates, shapes or patterns by means of suitable videoprojection means (2 thru 4), the positioning at will of the image or images on the surface of the base, after the optimum positioning has been achieved, the memorizing of the position data of said images and, on the basis of said data, the command to plot on the base and/or to cut out thereof.

Major applications: with the leather and textile industries.

13 Claims, 1 Drawing Sheet

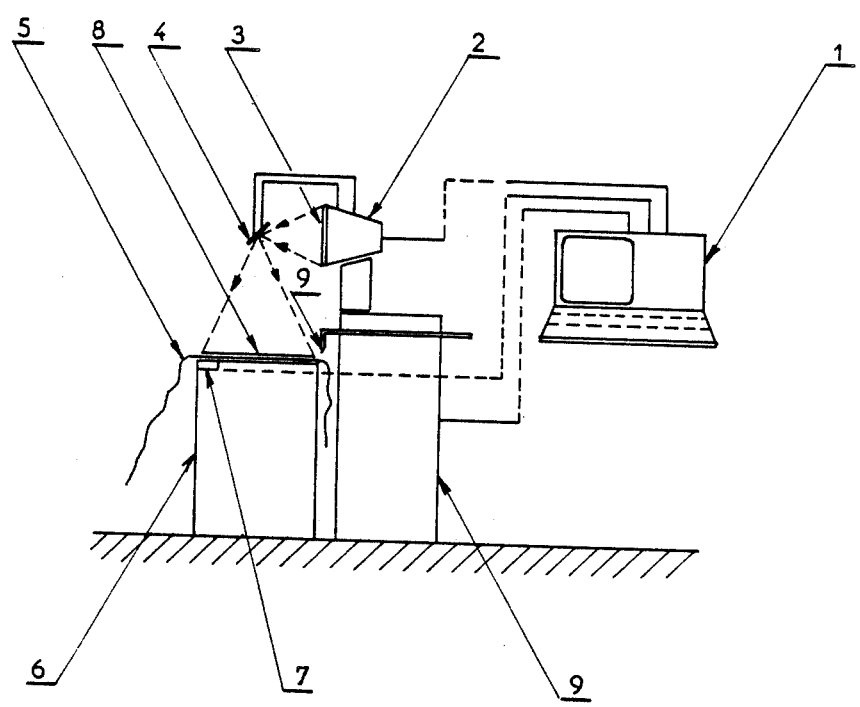

METHOD AND APPARATUS FOR A RECIPROCATING LAY SYSTEM OF PROFILE PIECES ON A BASE FOR THE PURPOSE OF PLOTTING AND/OR CUTTING

BACKGROUND OF THE INVENTION

The present invention relates to a reciprocating process of laying any profile piece on a given supporting base consisting of any sheet, plate, or film material in one or several layers, in order to plot on the said base and/or to cut from it the contour of said pattern profile pieces, while arranging said profile pieces on the base so as to minimize the loss of the base material, eventually taking into consideration such parameters as, for instance, those inherent to the nature of the material or to the intended purpose of the plotted and/or cut pieces.

The invention more particularly applies to the cutting of patterns in the leather industry and especially the shoe industry, but it may as well apply to any other fields where there is a problem of the optimum arrangement of varied and more or less elaborated profile pieces on a base of whatever character in view of plotting and/or cutting said profile pieces.

In the shoe industry, the cutting of parts with a sophisticated contour is mostly achieved by means of hollow punches. This approach gives the operator the control of the positioning of his tool onto the skin to be cut out, for small enterprises however it is expensive and increases the response time of the firm by reason of the time required for the preparation of the tools.

Over the recent years, new technological approaches have been introduced in leather cutting procedures, which tend to supersede hollow punches.

Thus, two new cutting processes: laser beam and fluid jet respectively have been developed, and, in association with computer techniques, they feature the utmost flexibility, thereby permitting a firm to control a variety of cutting out and/or plotting requirements over a very short period.

However the process of positioning the pattern pieces on the leather or skin is thereby made complex and expensive and no satisfactory solution has been offered to date.

According to a first lay technique known already, a reference skin is covered by hand by the cutting operator with several paper or cardboard templates. After the skin has been covered in this way, it is scanned and stored into a computer memory which subsequently controls the cutting of the skin in compliance with the stored data. This approach is time-consuming, not easily practicable and it requires the preparation of templates.

According to a more sophisticated and computerized technique a computer handles every skin in accordance with the skin defects and, in the surface available, it arranges the positioning of the various patterns previously entered in the computer memory, next, it initiates the cutting out of the skin.

Unfortunately this both complex and expensive system has never being developed to a reliable operational condition and it cannot be utilized in the industry.

SUMMARY OF THE INVENTION

The purpose of the invention is to provide reliable, fast and unexpensive means of laying, suitable for association with modern computer-controlled cutting techniques, and more especially the laser beam and water jet technique.

To this effect, the object of the invention is a reciprocating process of laying shapes on a base in view of plotting thereon and/or cutting therefrom, characterized by the storage of the coordinates of a variety of templates, shapes, patterns in a computer memory, by the direct or indirect display of one or more images of said stored templates, shapes or patterns onto the surface of the said base after its arrangement on a plotting or cutting out table by means of a suitable videoprojection device, by the positioning of said image or images onto the surface of the base at will, and, after the optimum positioning has been obtained, by the memorization of the position data of said images, on the basis of said data, the command of plotting on and/or cutting out from the base is issued.

This process is a simple and inexpensive solution to the laying of any profile pieces or contours to be cut out by means derived from the above-mentioned new technologies. In addition to this, it permits substantial time savings, since the base is directly placed on the plotting or cutting out table in view of the positioning of the profile pattern pieces, immediately followed by the plotting and/or cutting out without necessity to remove and re-position the base since it has been properly installed for plotting and cutting-out.

This process is suitable for cutting out a skin or any material consisting of one sheet or film as well as of multisheet material base.

Regarding the projection of said images onto the base, it can be achieved either directly by means of a commercially available videoprojector, associated with the aforesaid computer unit or indirectly by means of a graphic screen associated with the computer unit and by an optic retroprojection device inserted between said screen and the base.

The invention has for another object an apparatus for carrying out the above-described process that will be now described in full with reference to the one enclosed figure showing a diagram of the arrangement of the major components of an apparatus constructed in conformity with the invention and operating with optic retroprojection means.

BRIEF DESCRIPTION OF THE DRAWINGS

The FIGURE is a schematic representation of one embodiment of the cutting apparatus according to this invention.

DETAILED DESCRIPTION OF THE DRAWINGS

The FIGURE illustrates a computer unit 1 connected with a display console 2 whose screen image displayed at 3 is retroprojected through an appropriate optic system 4 onto the surface of a cut-out base 5, by example, a skin placed on a cutting table 6 and held, by example, by a suction device that keeps it lying flat onto the table in a known way.

The computer unit 1 is also connected with a control system 7 for displaying and shifting at will one or more images of the templates, shapes or patterns previously stored in the computer memory, on the screen 3.

Said system 7, fitted in the immediate vicinity of the working table of the cutting table 6 is, by example, a "mouse", a handle or a light pen. Such a device is of known type and is commonly used and there is no need to describe it more in-depth. The plurality of cut out templates, shapes or patterns are, by example, stored on a magnetic tape in form of numeric two-dimensional coordinates. It can be a magnetic data carrier from upstream C.A.D. means. The release programs (that dictate the number and the type of pieces to be cut out) are also stored on a magnetic data carrier that may originate from a central scheduling/releasing unit. The various data hereto are previously entered into the computer unit 1.

The cutting operator calls for the various pieces he has to cut from the skin 5. The image of each piece is individually displayed on the graphic screen 3 and retroprojected by optic means 4 (for instance a plane mirror) onto base 5 within a surface 8 that corresponds to the dimensions of the display screen 3.

The operator watches the image projected by the optics 4 within the surface 8 and, using the control 7, he fits said image over the skin 5 in the best possible conditions, according to direction of its structure and keeping clear of defects, quite in the same manner as he would do with a puncher. Once he has achieved the best possible arrangement, the operator actuates the validation control that enters into the computer said optimum positioning of the image considered, followed by the cutting out of the skin 5 along the validated path, by example, with an automatic cutting system symbolized as 9, either laser beam or water jet, connected with the computer unit 1 and associated with the table 6.

The surface 8 corresponds of course to the surface of the working plane of the cutting means 9. The computer unit is programmed for correspondence of the position of said cutting means inside said working surface with the position of the image of any piece arranged in any way on the graphic screen. Therefore the cutting device cuts out the skin 5 according to plots that are strictly conform with the lay-out of the displayed images on the screen and with the projection of said lay-out onto the skin.

Once the cutting out operation is completed the cutting device of means 9 retracts and the operator can call for another image onto the screen 3.

To quicken the procedure it is possible to lay several images side by side as permitted by the limits of the surface 8 and then the cutting out is initiated only after obtaining a satisfactory positioning of several images.

The screen 3 is preferably as plane as possible in order to ensure the best possible definition for the images retroprojected at 8. On the other hand, the greater the brightness of the screen 3 and the larger the image of the screen 3 on the skin 5.

In this way, it is possible to enlarge two times (and more) the total cutting surface as projected (surface 8) and therefore to place on the skin some images which, with their actual dimensions, could not be accepted within the dimensions of the screen 3.

If necessary, the optics means 4 will be fitted with a color filter in order to increase the colour contrast on the skin 5.

It is possible to cut one or more skins arranged in multi-layer base on the table 6 in one operation.

The fluctuations in skin thickness cause variations in the distance between the image projected at 8 and the optics means 4, but they do not affect the precision of the cutting with respect to the manual positioning achieved.

When handling a multi-layer base and in order to ensure an image of the screen 3 of unchanging dimensions on the skin 5 positioned on table 6, it is possible either to provide for vertical adjusting means of table 6 with respect to optics 4, or to complement optics 4 with further optics means that project the image of the screen 3 onto the working plane of the table 6 as a parallel beam.

An alternate method is to arrange the retroprojection of images onto the base directly through a videoprojector permitting to eliminate the optic means 4. Such an apparatus is perfectly known and no detailed description is required. It is used instead of the display console 2, is connected with the computer 1 and, on the surface of the skin disposed as a screen in front of the videoprojector, it displays a high definition light image that the cutting operator watches and arranges at will exactly as in the device illustrated.

In this way, the process of the invention provides a simple, inexpensive and very convenient solution for the positionning of any profile pieces to be cut out by means of computer-controlled systems such as laser beam or water jet, with the elmination of any intermediate stage of template preparation.

The invention applies more specifically to the leather and textile industries but, more generally, it may be applied to the plotting and cutting out of contours or of any patterns on single or multi-layer base consisting of foil, film, textile pad, plate of any kind of flexible, semirigid or rigid material.

There is claimed:

1. A process for arranging at least one pattern on a base material and cutting said material in conformance with said patterns comprising:
   (a) storing image coordinates of at least one pattern in a computer unit;
   (b) positioning a base material on a surface suitable for performing said cutting;
   (c) forming an image of said pattern from stored coordinates;
   (d) projecting at least one of said images onto said base material wherein said projecting is direct or indirect and operatively connected to said computer unit;
   (e) manipulating and selectively moving at least one projected image on said material by control of said computer to achieve an arrangement of at least one of said images; and
   (f) cutting said base material in accordance with said arrangement of images and under control of said computer.

2. A process as in claim 1 wherein said arrangement is stored in said computer for later recall and use as said pattern.

3. A process as in claim 1 wherein said base material is leather.

4. A device for arranging at least one projected pattern on a base material and cutting said material in conformance with said at least one pattern comprising:
   (a) a computer unit containing coordinate information of least one pattern;
   (b) projection means connected to said computer such that projection, movement, and control of at least one projected pattern is performed by said computer;
   (c) position control means for said at least one projected pattern and connected to said computer; and
   (d) plotting or cutting means connected to said computer and activated by command and control from said computer.

5. A device as in claim 4 wherein said projection means comprises a graphics screen and a retroprojection optics means wherein said screen is connected to said computer for image delay and wherein said optics means acts on an image displayed on said graphics screen.

6. A device as in claim 5 wherein said retroprojection optics means comprises an optic mirror.

7. A device as in claim 6 wherein said retroprojection optics means further comprises a filter.

8. A device as in claim 4 further comprising a support means for said base material.

9. A device as in claim 8 wherein said support means is a flat surface.

10. A device as in claim 9 wherein said projection means projects an image on said support means.

11. A device as in claim 4 wherein said plotting or cutting means comprises a cutting means.

12. A device as in claim 11 wherein said cutting means comprises a laser.

13. A device as in claim 11 wherein said cutting means comprises a stream of water.

* * * * *